United States Patent [19]
Fukuzaki

[11] Patent Number: 5,792,997
[45] Date of Patent: Aug. 11, 1998

[54] POSITION TRANSDUCER AND POSITION SENSING METHOD

[75] Inventor: Yasuhiro Fukuzaki, Otone-machi, Japan

[73] Assignee: Wacom Co., Ltd., Japan

[21] Appl. No.: 588,046

[22] Filed: Jan. 22, 1996

[30] Foreign Application Priority Data

Apr. 4, 1995 [JP] Japan .................................. 7-103104

[51] Int. Cl.$^6$ .......................... G08C 21/00; G09G 3/02
[52] U.S. Cl. .................... 178/18; 178/19; 345/174; 345/179
[58] Field of Search .......................... 178/18, 19, 20; 345/173, 174, 179

[56] References Cited

U.S. PATENT DOCUMENTS

| | | | |
|---|---|---|---|
| 4,832,144 | 5/1989 | Murakami et al. | 178/18 |
| 4,878,553 | 11/1989 | Yamanami et al. | 178/18 |
| 5,414,226 | 5/1995 | Matsushima | 178/19 |
| 5,466,896 | 11/1995 | Murakami et al. | 178/19 |
| 5,557,076 | 9/1996 | Wieczorek et al. | 178/19 |

FOREIGN PATENT DOCUMENTS

| | | |
|---|---|---|
| 6370326 | 3/1988 | Japan . |
| 63108424 | 5/1988 | Japan . |
| 63108425 | 5/1988 | Japan . |
| 63108426 | 5/1988 | Japan . |
| 253805 | 11/1990 | Japan . |
| 3147012 | 6/1991 | Japan . |

OTHER PUBLICATIONS

U.S. Serial # 08/585,786, Filed Jan. 16, 1996 and Allowed Jul. 22, 1997.

Primary Examiner—Steven Saras
Assistant Examiner—Vijay Shankar
Attorney, Agent, or Firm—Joseph W. Berenato, III

[57] ABSTRACT

A position transducer and a position sensing method which permit the sensing of a coordinate of a plurality of position indicators without changing resonance frequencies of the plurality of position indicators. The position transducer is made up of a first group of antennas arranged one after the other in one of two directions which cross each other at right angles within a two-dimensional plane; a second group of antennas arranged one after the other in the other direction which is at right angles to the one direction within the two-dimensional plane. The method includes selecting an antenna capable of transmitting a more intensive electromagnetic wave to a position indicator to be measured compared with an electromagnetic wave sent to the other position indicator(s); transmitting an electromagnetic wave to the position indicator to be measured from the selected antenna; and receiving a response electromagnetic wave while scanning the antennas by switching the first and second groups of antennas one after the other.

11 Claims, 9 Drawing Sheets

Fig. 3A
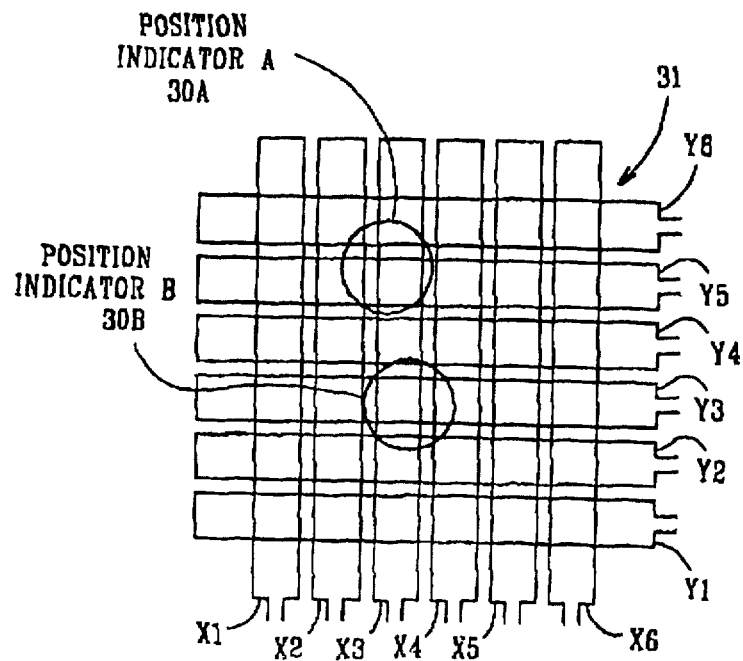
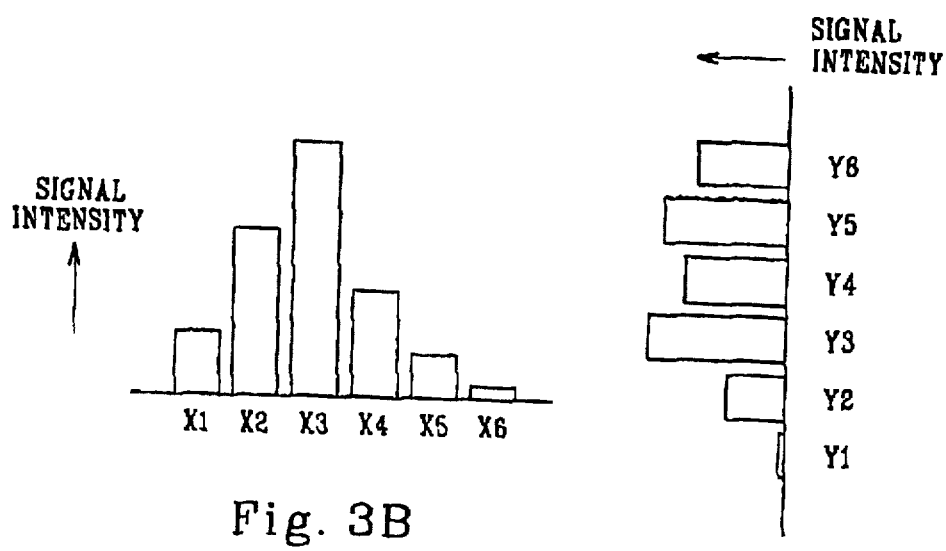
Fig. 3B
Fig. 3C

Fig. 4A
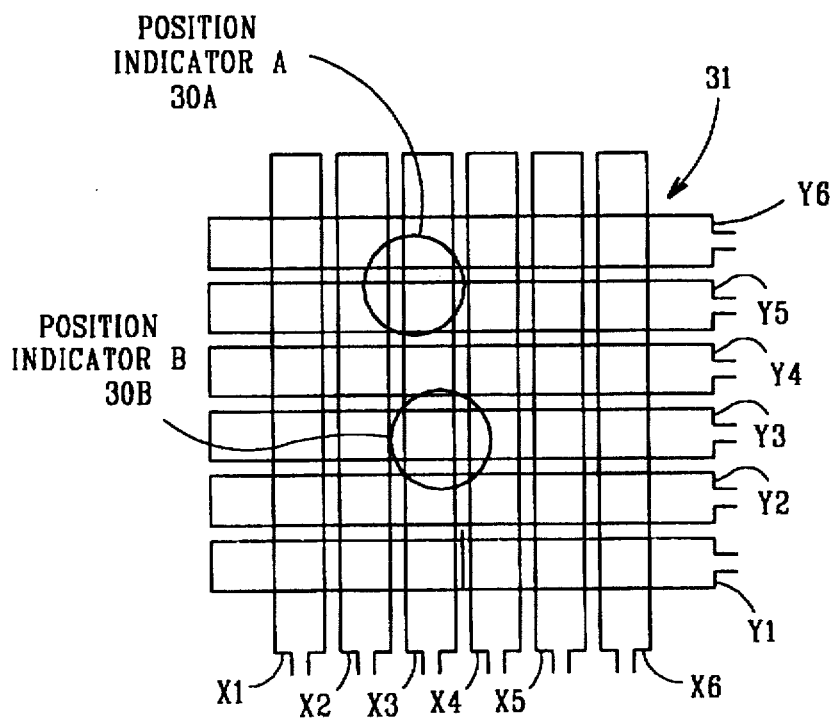
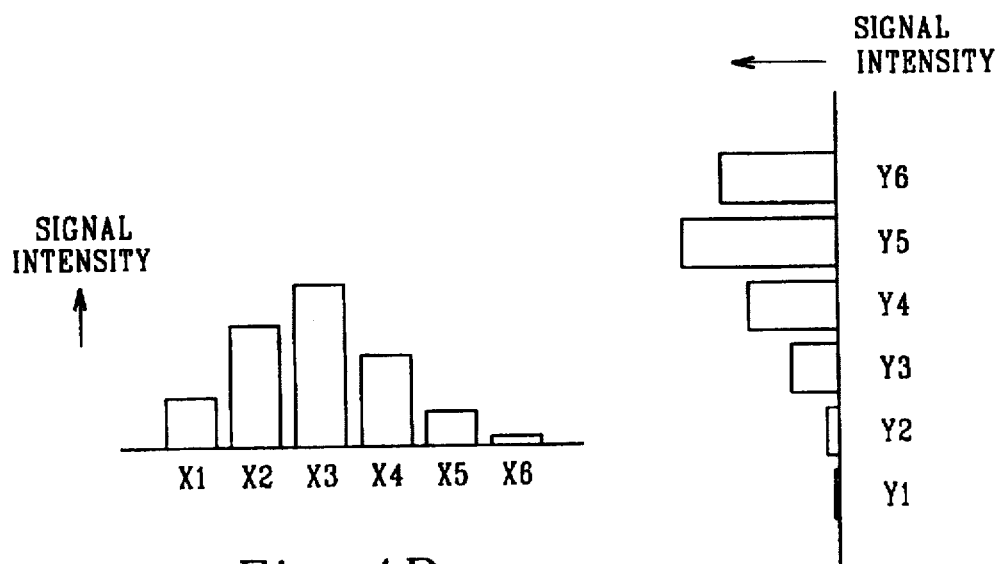
Fig. 4B
Fig. 4C

POSITION TRANSDUCER AND POSITION SENSING METHOD

BACKGROUND OF THE INVENTION

1. Field of the Invention

This invention relates to a position transducer and a position sensing method which use a plurality of position indicators.

2. Description of the Prior Art

There is an electromagnetic transfer method as a position sensing method for a digitizer. For example, in a configuration comprising a position sensing plane, consisting of a plurality of loop coils arranged side by side, and a position indicator such as a pen or a cursor, the loop coils are used as a sensor, i.e., an antenna, and an electromagnetic wave is transferred between the loop coil and the position indicator utilizing an electromagnetic interaction developed between the loop coil and the position indicator. A coordinate, and other associated information of the position indicator, are sensed based on a signal detected as a result of the transfer of the electromagnetic wave. One of the important characteristics of this method is that it is possible to make the position indicator cordless. The applicant has put forward a variety of digitizers employing this electromagnetic wave transfer method as disclosed in Japanese Patent Publn. No. HEI-2(1990)-53805 and Japanese Patent Laid-open No. HEI-3(1991)-147012. One of the major subjects of the techniques disclosed in the Patent Publications is how to accurately and rapidly acquire data from received signals by preventing noise.

In such an electromagnetic wave transfer method, an electromagnetic wave is received from, for example, one selected antenna, and this selected antenna again receives the electromagnetic wave re-radiated from a resonance circuit or a coil housed in the position indicator. These transmission/reception operations are repeated by switching the antennas one after the other. Calculation, including interpolation, is carried out based on a signal from an antenna located from which a signal having the largest intensity is received and signals from antennas adjacent to that antenna, whereby a coordinate of the position indicator is decided.

A cordless position transducer which permits the use of two position indicators is also known as disclosed in Japanese Patent Laid-open Nos. SHO-63(1988)-70326, 108424, 108425, and 108426. In this position transducer, resonance frequencies of resonance circuits of two position indicators are set so as to be different from each other. Interference from the resonance circuit of one position indicator is eliminated by the use of the resonance frequency of the resonance circuit of the other position indicator used for position sensing, and the position of the latter position indicator is measured.

In this method, plurality of position indicators are distinguished from each other by virtue of resonance frequencies, it is necessary to previously assign inherent resonance frequencies respectively to the position indicators. Hence, it is impossible to concurrently use the position indicators assigned the same resonance frequency. For this reason, this method has a problem of the limitation of the combination of position indicators which are simultaneously usable. In other words, if the same resonance frequency is assigned to a plurality of position indicators, and if these position indicators are simultaneously located in a position sensing area of the position transducer, signals from the resonance circuits are mixed up and interfere with each other. This occasionally makes it impossible to obtain signals necessary to detect respective positions of the position indicators. For example, this is applicable to the case of a plurality of resonance circuits of position indicators being positioned at a place where the position indicators are coupled to one antenna.

Particularly, a conventional sensing method employs the scan of transmission antennas, and hence the degree of transmission of electromagnetic waves from antennas connected to a plurality of position indicators is high at the time of transmission. In addition to this, it is necessary to scan antennas provided along the X axis at the time of transmission and reception to obtain a coordinate value of the X axis. Therefore it is difficult to prevent interference occurring between the plurality of position indicators.

Accordingly, when positions of the position indicators were sensed in the prior art, there was no alternative but to previously change respective resonance frequencies of the position indicators.

The present invention is made in view of these drawbacks in the prior art, and the object of this invention is to provide a position transducer and a position sensing method which is capable of detecting a coordinate of each position indicator.

SUMMARY OF THE INVENTION

In the first aspect of the present invention, a position transducer which detects positions of at least two cordless position indicators, each housing a resonance circuit which consists of at least a coil and a capacitor, above a two-dimensional plane. The position transducer comprises:

a first group of antennas arranged one after the other in one of two directions, which cross each other at right angles, within the two-dimensional plane;

a second group of antennas arranged one after the other in the other direction which is at right angles to the one direction within the two-dimensional plane;

selection means for selecting at least an antenna, capable of transmitting an electromagnetic wave while being strongly combined with a position indicator to be measured, from among the first and second groups of antennas;

transmission means for transmitting, to the position indicator to be measured, an electromagnetic wave having a frequency in the vicinity of a resonance frequency of the resonance circuit of the position indicator to be measured from an antenna selected by the transmission means; and reception means for receiving a response electromagnetic wave developed as a result of electromagnetic interaction between the electromagnetic wave transmitted from the transmission means and the resonance circuit of the position indicator while scanning the antennas by switching the first and second groups of antennas one after the other.

Here, the selection means selects a plurality of antennas, and wherein an electromagnetic wave, consisting of the combination of electromagnetic waves respectively being transmitted from the plurality of antennas by means of the transmission means, may be more intensively transmitted to the position indicator to be measured compared with an electromagnetic wave transmitted to the other position indicators.

The transmission means may transmit an electromagnetic wave, having an opposite phase to a phase of the electromagnetic wave transmitted from the selected antennas, from antennas other than the plurality of antennas selected by the selection means which are strongly combined with other position indicators, except the position indicators to be measured.

In the second aspect of the present invention, a position sensing method for detecting positions of at least two cordless position indicators, each housing a resonance circuit which consists of at least a coil and a capacitor, above a two-dimensional plane, the position transducer comprises:

- a selection step for selecting an antenna capable of transmitting an electromagnetic wave while being strongly combined with a position indicator to be measured, from among a first group of antennas arranged one after the other in one of two directions, which cross each other at right angles, within the two-dimensional plane, and a second group of antennas arranged one after the other in the other direction which is at right angles to the one direction within the two-dimensional plane;
- a transmission step for transmitting, to the position indicator to be measured, an electromagnetic wave having a frequency in the vicinity of a resonance frequency of the resonance circuit of the position indicator to be measured from an antenna selected in the selection step; and
- a reception step for receiving a response electromagnetic wave developed as a result of electromagnetic interaction between the electromagnetic wave transmitted from the transmission means and the resonance circuit of the position indicator while scanning the antennas by switching the first and second groups of antennas one after the other.

Here, the antenna selected by the selection means is a plurality of antennas, and an electromagnetic wave, consisting of the combination of electromagnetic waves respectively being transmitted from the plurality of antennas by means of the transmission means, may be more intensively transmitted to the position indicator to be measured compared with an electromagnetic wave transmitted to the other position indicators.

The transmission means may transmit an electromagnetic wave, having an opposite phase to a phase of the electromagnetic wave transmitted from the selected antennas, from antennas other than the plurality of antennas selected by the selection means which are strongly combined with other position indicators except the position indicators to be measured.

In this invention, an electromagnetic wave is fixedly transmitted to an antenna closest to a position indicator to be measured, and antennas are scanned one after the other only when the electromagnetic wave is received. This makes it possible to measure a coordinate of the position indicator to be measured by measuring a response electromagnetic wave from the same, even when the same resonance frequency is assigned to resonance circuits of a plurality of position indicators.

By virtue of the present invention, it is possible to independently detect each position indicator without previously setting resonance frequencies of resonance circuits housed in position indicators to a plurality of frequencies by transmitting an intensive electromagnetic wave to a selected position indicator. Therefore, free combination of position indicators in relation to the position transducer becomes possible.

BRIEF DESCRIPTION OF THE DRAWINGS

FIGS. 3A through 3C are charts illustrating selection steps according to the present invention.

FIGS. 4A through 4C are charts illustrating an example of reception according to the present invention.

FIGS. 7A and 7B are schematic representations, wherein FIG. 7A shows steps of the scanning of antennas at the time of transmission and reception in the prior art, and FIG. 7B shows steps of the scanning of antennas at the time of transmission and reception in one embodiment of the present invention.

DESCRIPTION OF THE PREFERRED EMBODIMENTS

With reference to the accompanying drawings, preferred embodiments of the present invention will be described in detail hereunder.

Figure 1:
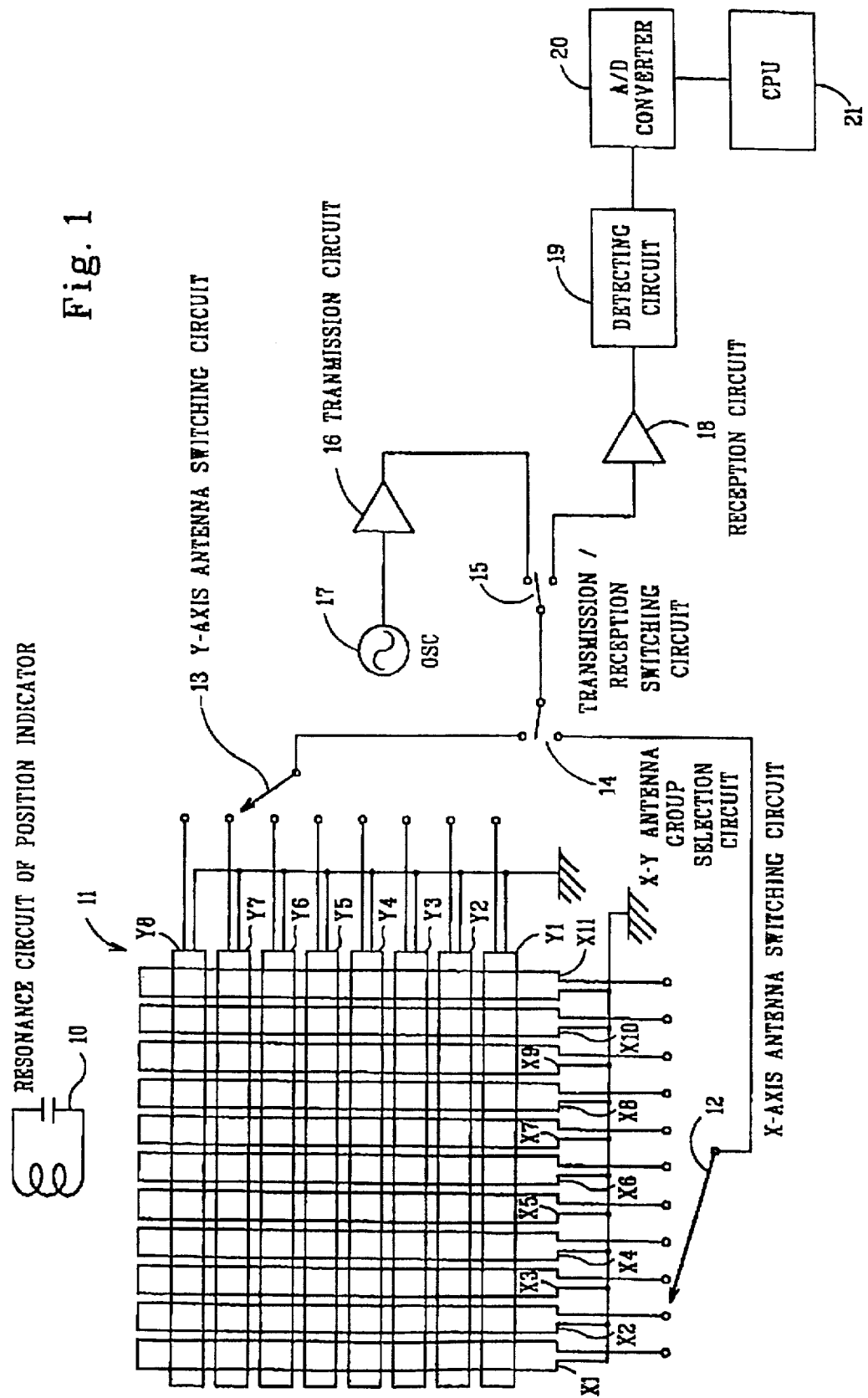
FIG. 1 is a schematic diagram showing the outline of configuration of a position transducer in a first embodiment of the present invention.

FIG. 1 schematically shows the configuration of a position transducer in a first embodiment of the present invention. Within a two-dimensional plane 11 of the position transducer, a first group of a plurality of antennas X1–X11 are arranged in a direction of the X axis (eleven antennas are shown in the drawing), and a group of a plurality of antennas Y1–Y8 are arranged in a direction of the Y axis (eight antennas are shown in the drawing). An X-axis antenna switching circuit 12 and a Y-axis antenna switching circuit 13 are respectively connected to the group of antennas X1–X1 and the group of antennas Y1–Y8. The X-axis antenna switching circuit 12 and the Y-axis antenna switching circuit 13 are connected to an antenna group selection circuit 14 and a transmission/reception switching circuit 15. A transmission circuit 16 and an oscillator 17 are connected to one end of the transmission/reception switching circuit 15, whilst the other end of the transmission/reception switching circuit 15 is connected to a receiving circuit 18, a detection circuit 19, an analog-to-digital converter 20, and a CPU 21. Reference numeral 10 designates a resonance circuit of a position indicator positioned at an arbitrary location above the two-dimensional plane 11, and the position transducer of the present invention is provided with a plurality of position indicators.

In the position transducer having such a configuration, it is possible to transmit to an arbitrary position indicator an electromagnetic wave having a frequency in the vicinity of a resonance frequency of the resonance circuit 10 of this position indicator from the transmission circuit 16 by the use of a selected antenna. The reception circuit 18 receives a response electromagnetic wave developed as a result of electromagnetic interaction between the electromagnetic wave and the resonance circuit 10, and a coordinate of the position indicator can be measured by the analysis of a power distribution of the received electromagnetic wave.

A more detailed explanation will be given of a method for measuring a coordinate of each position indicator using the above-mentioned position transducer when a plurality of position indicators are used.

Figure 2:
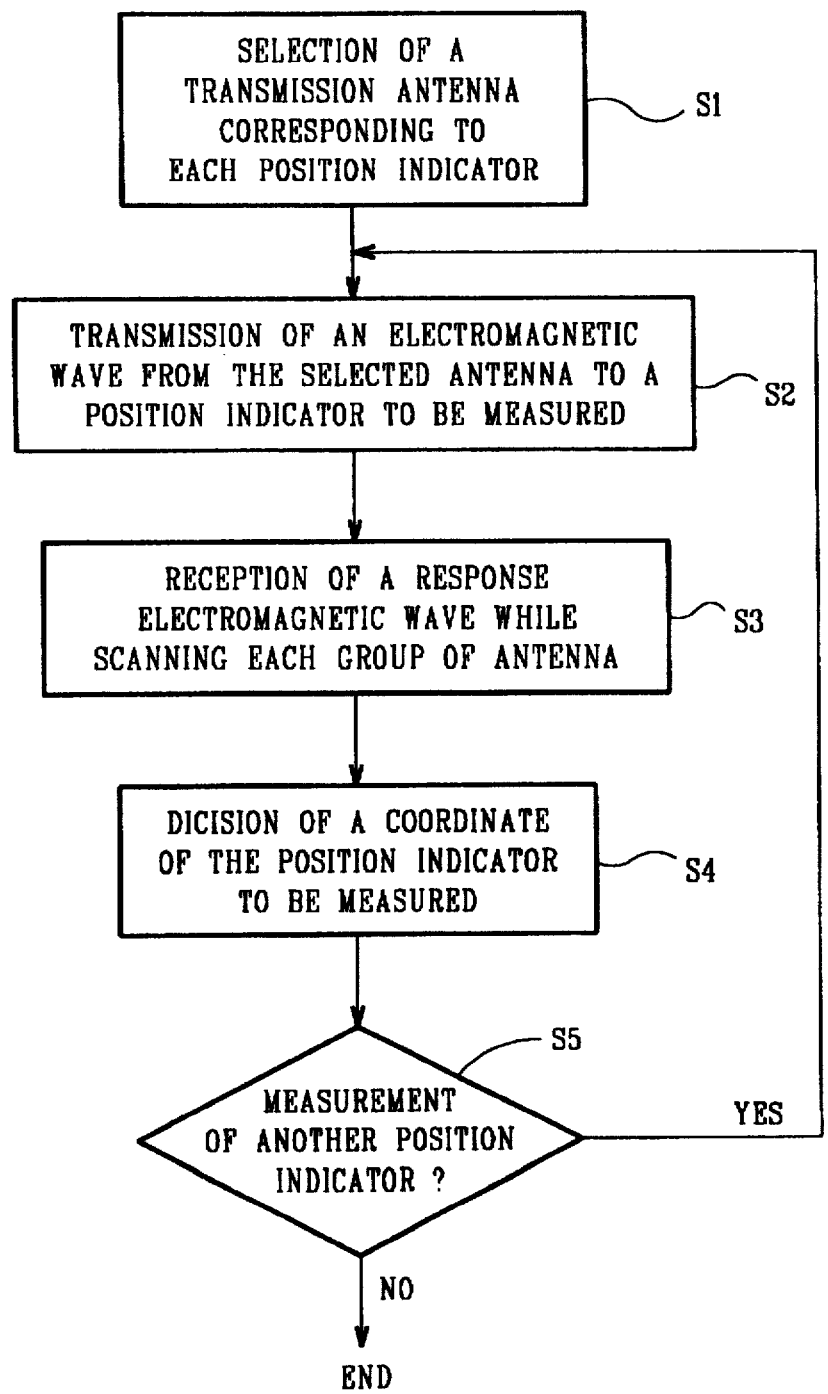
FIG. 2 is a flow chart showing the flow of operations of a position sensing method in one embodiment of the present invention.

FIG. 2 is a flow chart showing one example of the coordinate measuring method. In step S1, an antenna is initially selected which is capable of transmitting a more intensive electromagnetic wave to a position indicator to be measured compared with an electromagnetic wave transmitted to the other position indicators. The step S1 is carried out by selection means in such a manner that all antennas are scanned by repeating transmission to and reception from each of all the antennas, and that an antenna is selected which is capable of transmitting an electromagnetic wave to a position indicator to be measured compared with an electromagnetic wave transmitted to the other position indicators. A specific example of this will be explained with reference to FIGS. 3A to 3C. As shown in FIG. 3A, position indicators 30A and 30B are situated above a two-dimensional plane 30 consisting of a group of antennas X1 through X6 and a group of antennas Y1 through Y6. FIGS. 3B and 3C show results of the intensity measurement of a signal received as a result of scanning each antenna in this state. As can be seen from the drawings, a received signal of X3 in the group of X-axis antennas has the largest intensity, whereas received signals of Y3 and Y5 in the group of Y-axis antennas have large intensity. When an electromagnetic wave is transmitted from the group of X-axis antennas, it is impossible to transmit an intensive electromagnetic wave to a specific position indicator. However, it is possible to transmit an intensive electromagnetic wave respectively to the position indicators 30B and 30A by transmitting an electromagnetic wave from the antennas Y3 and Y5. Hence, Y5 and Y3 are selected as antennas corresponding to the position indicators 30A and 30B.

Subsequently, in step S2 shown in FIG. 2, the selected antenna transmits an electromagnetic wave having a frequency in the vicinity of a resonance frequency of resonance circuits of the position indicator. In step 3, a response electromagnetic wave developed as a result of electromagnetic interaction between the transmitted electromagnetic wave and the resonance circuits of the position indicators is received while all of the antennas are being scanned. A coordinate of the position indicator is determined from a result of the scan in step S4. One example of this result is shown in FIGS. 4A through 4C. It can be seen that the position indicator 30A is situated at an intersection between the antennas X3 and Y5 from the result shown in FIGS. 4A and 4B.

Figures 5A, 5B, 5C:
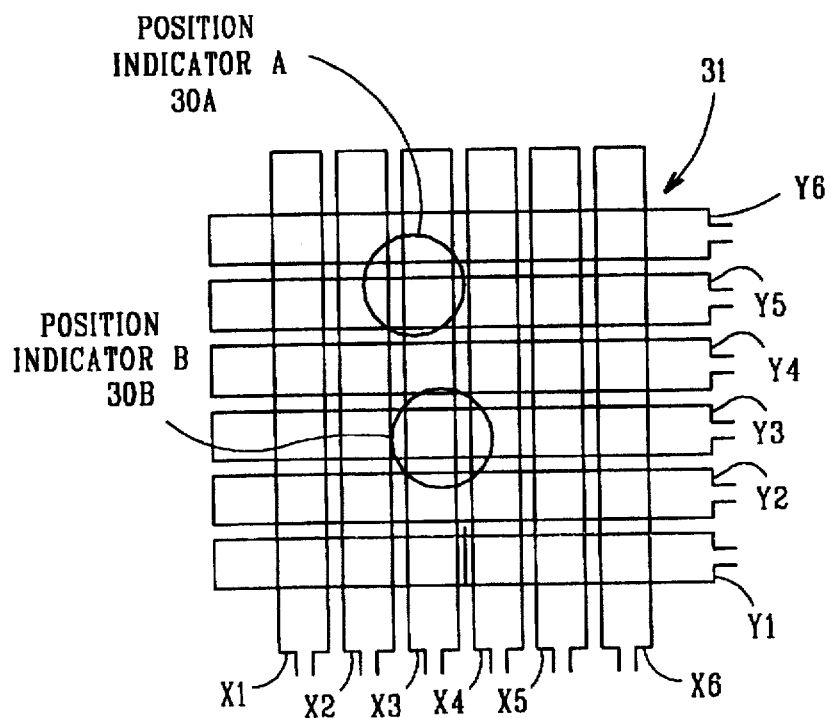
FIGS. 5A through 5C are charts illustrating an example of reception according to the present invention.

In step S4 shown in FIG. 2, whether or not another position indicator to be measured is present is determined. When there is another position indicator to be measured, the procedures will be repeated from step S2. In this embodiment, since the position indicator 30B is subsequently measured, the procedures return to step S2. The antenna Y3 transmits an electromagnetic wave this time. The antennas are respectively scanned while a response electromagnetic wave is being received (step S3), and the position of the position indicator 30B is determined from the result of the scan (step S4). One example of this result is shown in FIGS. 5A through 5C. It can be seen from FIGS. 5B and 5B that the position indicator 30B is situated at an intersection between the antennas X3 and Y3.

Figure 6:
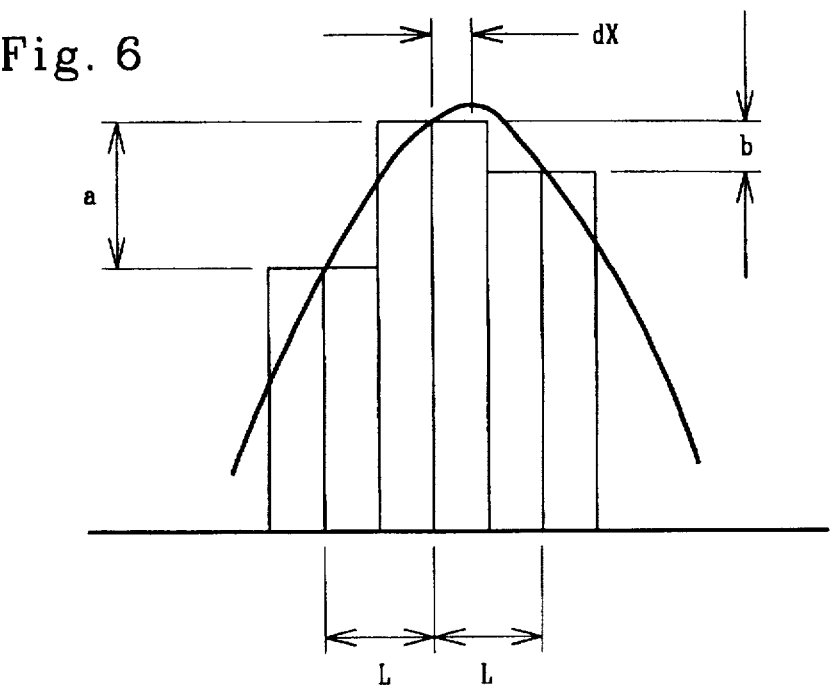
FIG. 6 is a plot showing one example of a waveform of a received signal in the first embodiment of the present invention.

In order to practically calculate a coordinate of the position indicator in step S4, for example, a waveform of a received signal shown in FIG. 6 is sampled at the position of an antenna. Whereby a difference ("a") between signal intensities of the antenna showing a peak intensity and an antenna on the left side of that antenna, and a difference ("b") between signal intensity of the antenna showing the peak intensity and an antenna on the right side of that antenna are obtained. A difference (dX) between the position of the antenna showing the peak intensity and the position of the actual peak of the signal intensity (i.e., the position of the position indicator) will be expressed as follows:

$$dX=\{(a-b)/(a+b)\} \times (L/2).$$

Accordingly, it is possible to calculate a coordinate of the position indicator by the use of this equation.

Figure 7A:
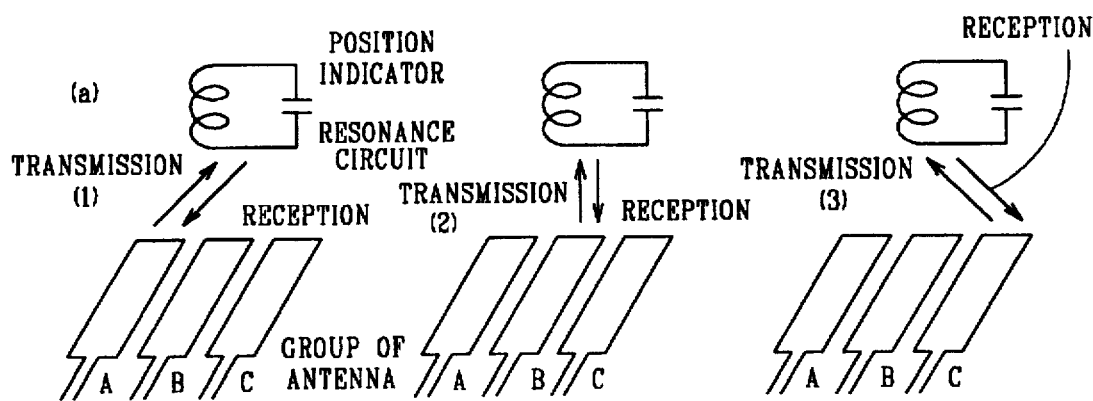
Figure 7B:
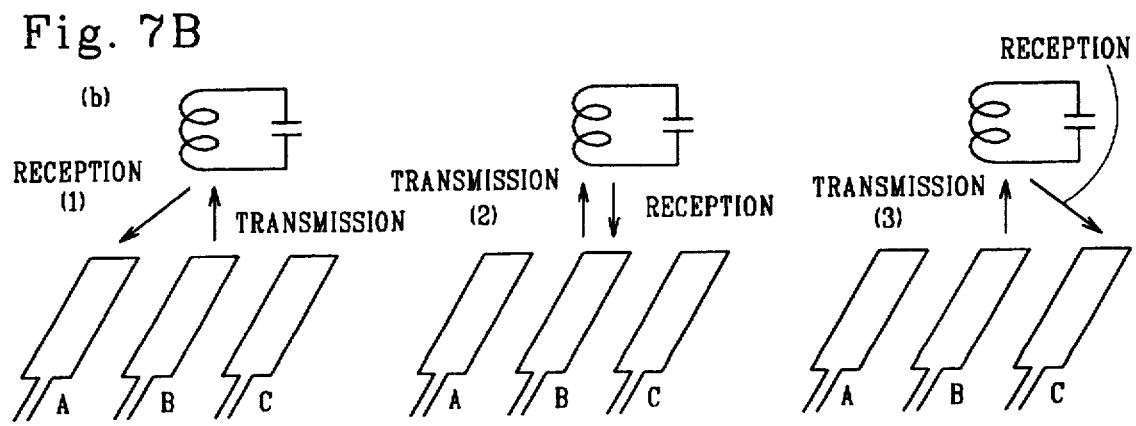

As described above, the present invention employs a method wherein an electromagnetic wave is fixedly transmitted to an antenna closest to the position indicator, and a coordinate is measured by scanning the antennas one after the other only at the time of reception of the electromagnetic wave. FIGS. 7A and 7B show a comparison between the previously described transmission/reception method and a conventional method. Specifically, in the prior art, transmission to and reception from the same antenna are carried out by scanning antennas as shown in FIG. 7A. On the other hand, according to the present invention, transmission is fixed to one antenna, and antennas are scanned only at the time of reception as shown in FIG. 7B. It is possible to prevent interference between a plurality of position indicators and receive a response electromagnetic wave by selecting, and transmitting an electromagnetic wave to an antenna which is most strongly combined with a position indicator to be measured.

Figure 8:
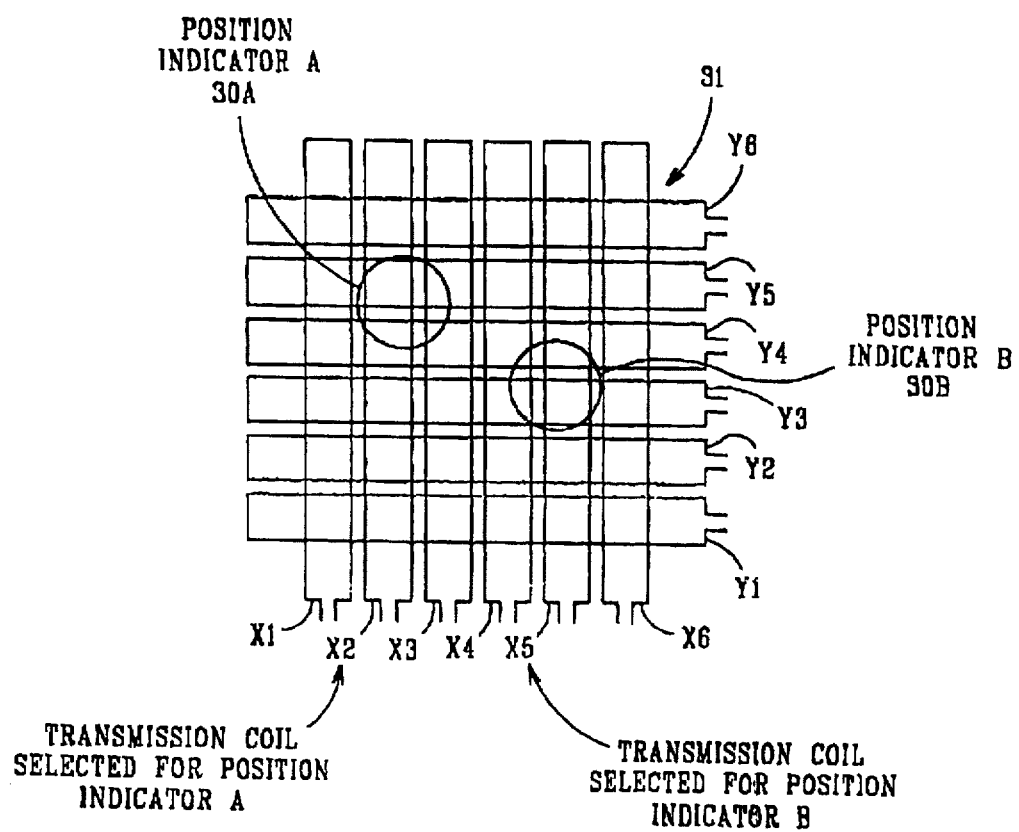
FIG. 8 is a diagram illustrating the configuration of position indicators in a second embodiment of the present invention.

Although the antenna provided in the direction of the Y axis transmits an electromagnetic wave in this embodiment, the antenna is not limited to the Y axis. For example, when position indicators are arranged in a matrix as shown in FIG. 8, antennas X2 and X5 arranged in the direction of the X axis transmit an electromagnetic wave. As a matter of course, if the position of the position indicator is changed, transmission antennas will be modified.

In the embodiment described above, a transmission antenna is individually used with respect to each position indicator. However, when more than three position indicators are used, it is impossible for an individual antenna to transmit an intensive electromagnetic wave only toward a specific position indicator. In such a case, a plurality of antennas are selected, and an electromagnetic wave is transmitted from the plurality of antennas to a specific position indicator. As a result of this, it is possible to transmit an intensive electromagnetic wave to a specific position indicator.

Figure 9A:
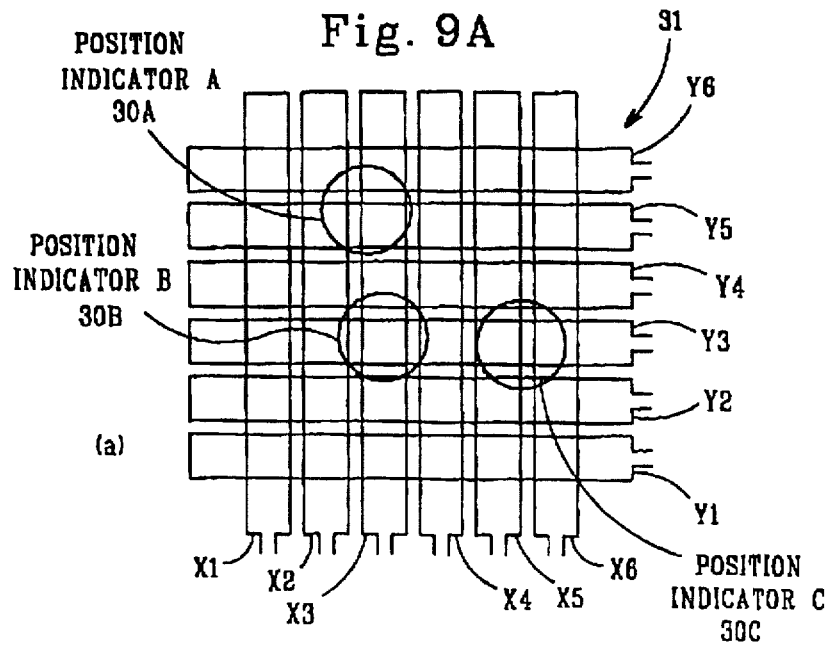
FIGS. 9A through 9C are charts illustrating a third embodiment using three position indicators.
Figure 9C:
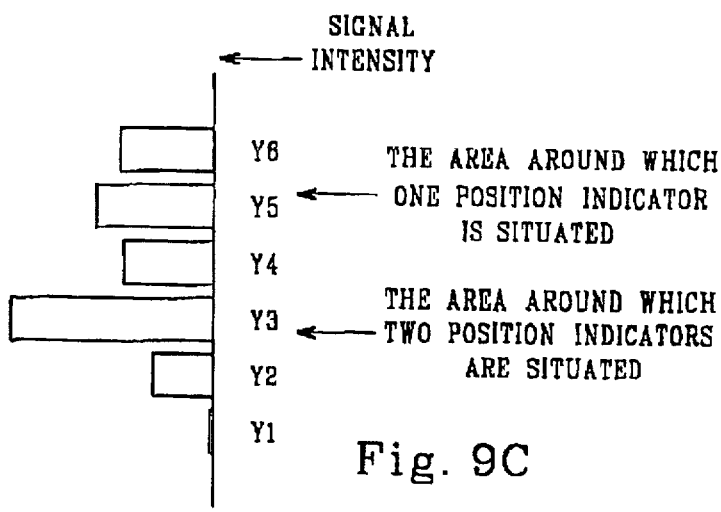
Figure 9B:
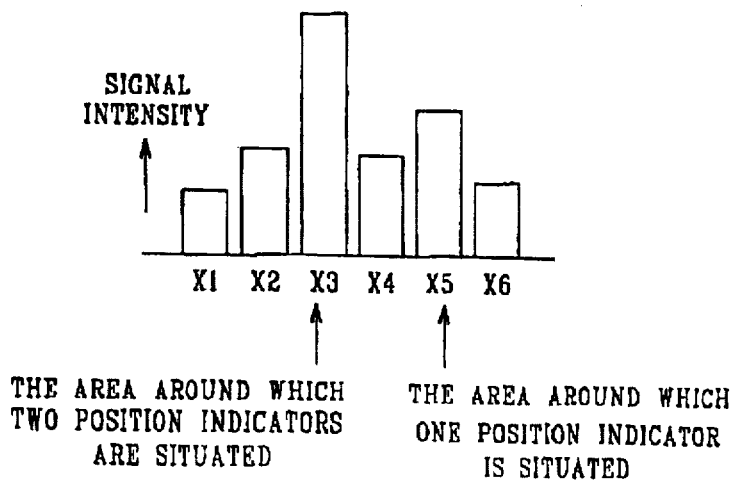

FIGS. 9A to 9C show an example which employs three position indicators. Even in this case, the intensity of a signal received from each antenna, as shown in FIGS. 9B and 9C, is obtained by scanning all of the antennas while transmission to and reception from each of all the antennas are repeated. As a result of this, it is known that two position indicators are situated at the position of the antenna X3 and one position indicator is situated at the position of the antenna X5, and that two position indicators are situated at the position of the antenna Y3 and one position indicator is situated at the position of the antenna Y5. Subsequently, an electromagnetic wave is transmitted from the antenna X3, and a response electromagnetic wave is received by the antennas Y3 and Y5. As a result of this, it turns out that the position indicators are respectively situated at an intersection between the antennas X3 and Y3 and an intersection between the antennas X3 and Y5. Moreover, the antenna X5 transmits an electromagnetic wave, and a response electromagnetic wave is received by the antennas Y3 and Y5. As a result, it turns out that the position indicator is situated at an intersection between the antennas X5 and Y3 but not at an intersection between the antennas X5 and Y5. Accordingly, Y5 and X5 can be selected as corresponding transmission antennas to the position indicators 30A and 30C, whereas X3 and Y3 can be selected as corresponding transmission antennas to the position indicator 30B. In other words, it is possible to transmit a more intensive electromagnetic wave to the position indicator 30B compared with an electromagnetic wave transmitted to the other position indicators by concurrently transmitting an electromagnetic wave from the antennas X3 and Y3. The reception of a response electromagnetic wave and the decision of a coordinate of a position indicator to be measured can be carried out in the same manner as in the previously mentioned embodiment.

In this way, it is possible to transmit an electromagnetic wave to the position indicator 30B by concurrently transmitting an electromagnetic wave to the antennas X3 and Y3. However, at this time, a weak electromagnetic wave is also transmitted to the position indicators 30A and 30C, and this electromagnetic wave returns as an interference signal at the time of reception of a response electromagnetic wave. Whether or not this interference signal is negligible depends on the accuracy of the coordinate of the position indicator 30B. Specifically, in order to increase the accuracy of a coordinate, it is necessary to transmit an electromagnetic wave having an opposite phase so as to cancel the electromagnetic wave transmitted to the position indicators 30A and 30C.

More specifically, an electromagnetic wave having the same phase is transmitted from the antennas X3 and Y3, and an electromagnetic wave having an opposite phase to that of the electromagnetic wave from the antennas X3 and Y3, is simultaneously transmitted from the antennas Y5 and X5 which cross the antennas X3 and Y3 at the position indicators 30A and 30C. For example, assuming that the intensity of an electromagnetic wave supplied along the center line of the antenna X3 is 1 and the intensity of an electromagnetic wave supplied along the antenna Y3 is also 1 when a.c. currents are fed to the antenna X3, an electromagnetic wave having about a doubled intensity will develop at an intersection between the antennas X3 and Y3 where the position indicator 30B is situated. In this case, the electromagnetic wave having a signal intensity of 1 also arrives at the antennas 30A and 30C. However, when an electromagnetic wave, having a signal intensity of 1 (−1) and an opposite phase, is radiated from the antennas Y5 and X5, the electromagnetic waves propagating through the antennas X5 and Y5 (each having an opposite phase) cancel each other at the position where the position indicator 30A is situated, as a result of which the intensity of the electromagnetic waves becomes nearly zero. Similarly, the electromagnetic waves propagating through the antennas Y3 and X5, each having an opposite phase, cancel each other at the position where the position indicator 30C is situated, as a result of which the intensity of the electromagnetic wave becomes nearly zero. Thereby, the electromagnetic wave only arrives at the position indicator 30B, and hence only a signal from the position indicator 30B can be received. Thus, it becomes possible to obtain a more accurate position of the position indicator 30B.

Figure 10:
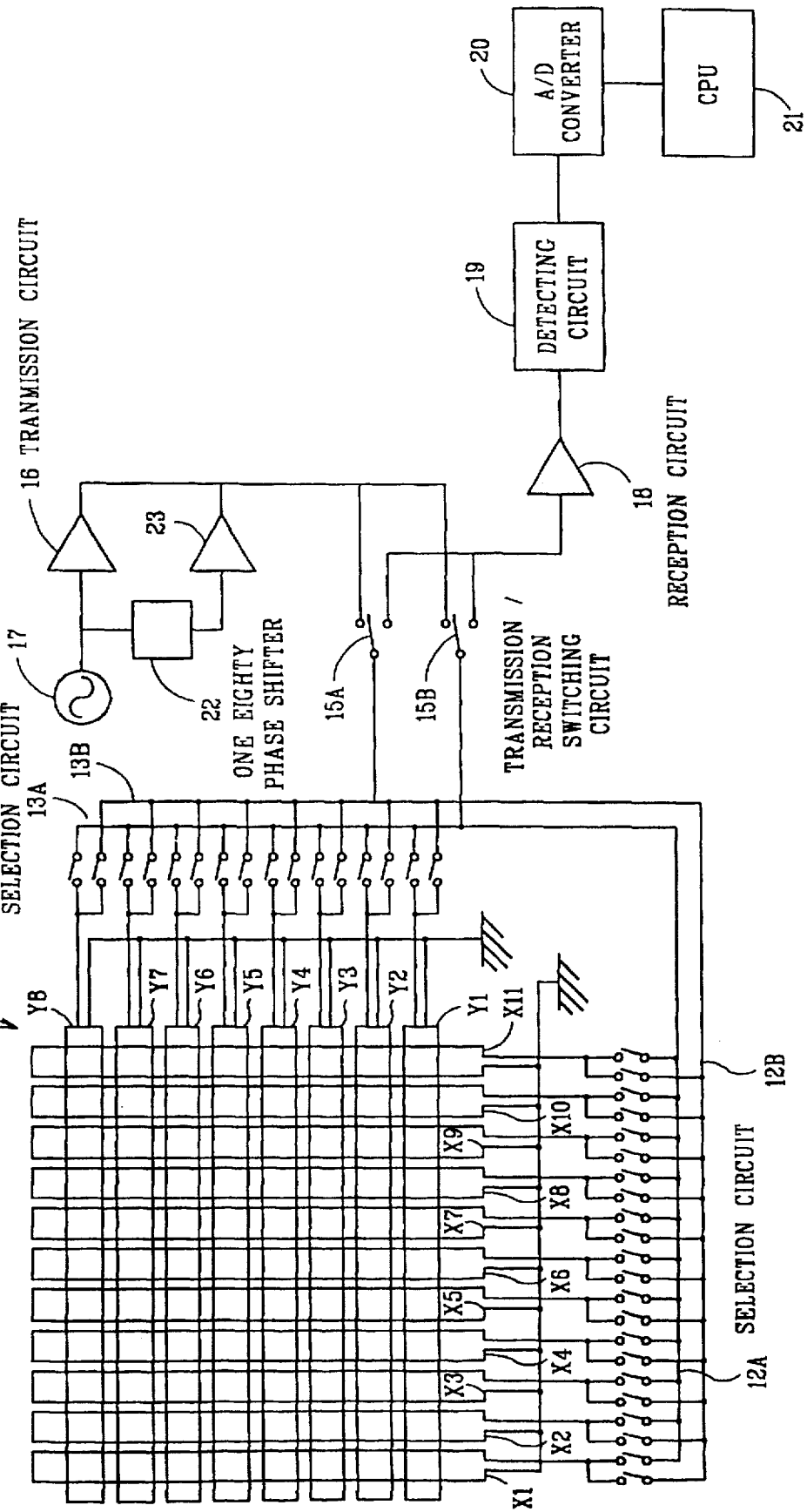
FIG. 10 is a schematic diagram showing the outline of configuration of a position transducer in a fourth embodiment of the present invention.

FIG. 10 is a schematic diagram showing the outline of configuration of a position transducer having the arrangement capable of transmitting an electromagnetic wave having an opposite phase, if necessary, as well as an electromagnetic wave from a plurality of selected antennas in the same way as described in the previous embodiments. In FIG. 10, the same reference numerals are provided to designate corresponding features disclosed in FIG. 1, and hence the explanation thereof will be omitted here for brevity.

In addition to the transmission circuit 16, the position transducer shown in FIG. 10 has a second transmission circuit 23 connected to the oscillator 17 via a one-eighty phase shifter 22. The position transducer is also provided with a first X-axis antenna selection circuit 12A and a first Y-axis antenna selection circuit 13A, both being connected to the transmission circuit 16, and a second X-axis antenna selection circuit 12B and a second Y-axis antenna selection circuit 13B, both being connected to the transmission circuit 23. The first X-axis antenna selection circuit 12A and the first Y-axis selection circuit 13A, and the second X-axis selection circuit 12B and the second Y-axis selection circuit 13B are respectively connected to the transmission and reception circuits via transmission/reception switching circuits 15B and 15A. Each of the antennas X1 to X11 and the antennas Y1 to Y8 are connected to the selection circuit via the switching circuit, and hence it is possible to arbitrarily select a plurality of antennas by on-off operation of the switch. Specifically, the use of the position transducer having such configuration permits transmission of an electromagnetic wave to a position indicator to be measured from the plurality of selected antennas at the time of transmission. Simultaneously, it is also possible to transmit an electromagnetic wave having an opposite phase to other position indicators from other selected antennas. Moreover, at the time of reception of a response electromagnetic wave, a reception circuit receives a response electromagnetic wave developed as a result of electromagnetic interaction between a transmitted electromagnetic wave and a resonance circuit of a position indicator. It is possible to measure a coordinate of the position indicator by analyzing a power distribution of the received electromagnetic wave.

Although the antennas are scanned one after the other when a response electromagnetic wave is received in the previously mentioned embodiments, it goes without saying that a plurality of reception circuits can be provided in such a way as to simultaneously receive a response electromagnetic wave from a plurality of antennas.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will, without departing from the spirit and scope of the invention, be apparent to persons skilled in the art.

What is claimed:

1. A position transducer which detects positions of at least two cordless position indicators each housing a resonance circuit which includes at least a coil and a capacitor, the two position indicators being located above a two-dimensional plane, the position transducer comprising:

a first group of antennas, arranged one after the other in one of two directions, which cross each other at right angles, within the two-dimensional plane;

a second group of antennas arranged one after the other in the other of the two directions which is at a right angle to the one direction within the two-dimensional plane;

selection means for selecting at least an antenna, capable of transmitting an electromagnetic wave while being strongly combined with a position indicator to be measured, from among the first and second groups of antennas;

transmission means for transmitting, to the position indicator to be measured, an electromagnetic wave having a frequency in the vicinity of a resonance frequency of the resonance circuit of the position indicator to be measured, from the antenna selected by the selection means;

reception means for receiving a response electromagnetic wave developed as a result of electromagnetic interaction between the electromagnetic wave transmitted from the transmission means and the resonance circuit of the position indicator to be measured while scanning the antennas by switching the first and second groups of antennas one after the other; and means for detecting the position of each of said two position indicators by the transducer receiving the resonance frequency, where each of said position indicators resonates at said resonance frequency.

2. The position transducer according to claim 1, wherein the selection means selects a plurality of antennas, and wherein an electromagnetic wave, consisting of the combination of electromagnetic waves respectively being transmitted from the plurality of antennas by means of the transmission means, is more intensively transmitted to the position indicator to be measured compared with an electromagnetic wave transmitted to the other position indicators.

3. The position transducer according to claim 2, wherein the transmission means transmit an electromagnetic wave, having an opposite phase to a phase of the electromagnetic wave transmitted from the selected antennas, from antennas other than the plurality of antennas selected by the selection means which are strongly combined with other position indicators, except the position indicators to be measured.

4. A position sensing method for detecting positions of at least two cordless position indicators, each housing a resonance circuit which includes a coil and a capacitor, above a two-dimensional plane, the method comprising the steps of:

providing each of said position indicators with a common resonance frequency;

a selection step for selecting an antenna capable of transmitting an electromagnetic wave while being strongly combined with a position indicator to be measured, from among a first group of antennas arranged one after the other in one of two directions;

providing a second group of antennas in the other of the two directions, in the two-dimensional plane, wherein the two directions are at right angles to one another;

a transmission step for transmitting, to the position indicator to be measured, an electromagnetic wave having a frequency in the vicinity of the common resonance frequency of the resonance circuit of the position indicator to be measured from the antenna selected in the selection step; and a reception step for receiving a response electromagnetic wave developed as a result of electromagnetic interaction between the electromagnetic wave transmitted in said transmission step and the resonance circuit of the position indicator to be measured while scanning the antennas in the second group by switching the first and second groups of antennas one after the other so that only the selected antenna from the first group is transmitting to the indicator to be measured and the second group is scanned to detect the position of the indicator to be measured.

5. The position sensing method according to claim 4, wherein the antenna selected in said selecting step includes a plurality of antennas lesser in number from the first group, and an electromagnetic wave including the combination of electromagnetic waves respectively being transmitted from the plurality of antennas in said transmission step, is more intensively transmitted to the position indicator to be measured compared with an electromagnetic wave transmitted to the other position indicator.

6. The position sensing method according to claim 5, wherein the transmission step transmits an electromagnetic wave, having an opposite phase to a phase of the electromagnetic wave transmitted from the selected antennas, from antennas other than the plurality of antennas selected in said selecting step which are strongly combined with other position indicators except the position indicators to be measured.

7. A method for detecting positions of first and second cordless position indicators relative to a digitizer tablet, wherein each of the first and second position indicators are used at the same time in conjunction with the tablet, and each position indicator includes a resonance circuit including a coil and a capacitor, and wherein each of the first and second position indicators has a common resonance frequency defined by the respective resonance circuits, the method comprising the steps of:

providing both of the first and second position indicators in use simultaneously proximate the tablet;

providing the digitizer tablet that includes a first plurality of parallel antennas aligned in a first direction and a second plurality of parallel antennas oriented in a second direction, wherein the first and second directions are perpendicular to one another;

determining a location of the first position indicator and selecting from the first plurality of antennas a first predetermined number of antennas, less than the first plurality, proximate the location of the first position indicator;

transmitting electromagnetic waves having a frequency in the vicinity of the common resonance frequency, from the first predetermined number of antennas selected in said selecting step from the first plurality, to the resonance circuit of the first position indicator;

the first position indicator receiving the electromagnetic waves from the selected first predetermined number of antennas, and in response thereto, transmitting response signals back to the digitizer tablet;

scanning the second plurality of antennas in the digitizer tablet in order to determine the position of the first position indicator so that the position of the first position indicator is determined by the first predetermined number of antennas from the first plurality working in conjunction with the second plurality of antennas which is scanned;

selecting a second predetermined number of antennas from the first plurality of parallel antennas, the second predetermined number of antennas being proximate the second position indicator and being of a number less than the first plurality, and the antennas in the second predetermined number being at least partially different than antennas in the first predetermined number;

transmitting electromagnetic waves from the selected second predetermined number of antennas to the second position indicator which in response thereto transmits response signals back to the digitizer tablet; and scanning the second plurality of antennas in order to determine the position of the second position indicator, whereby the positions of the first and second position indicators, each having a common resonance frequency, are determined when both are concurrently used, via selected antennas from the first plurality and scanning the second plurality.

8. The method of claim 7, wherein the first predetermined number of antennas is a single antenna selected from the first plurality, and wherein the second predetermined number of antennas is a single antenna selected from the first plurality of antennas.

9. A digitizer system for detecting positions of a plurality of different position indicators which are used in conjunction with a digitizer tablet at the same time, the system comprising:

- first and second position indicators that are used in conjunction with said digitizer tablet at the same time, each of said first and second position indicators including a resonance circuit therein which includes a coil and a capacitor, and wherein each of the first and second position indicators defines a common resonance frequency;
- said digitizer tablet including a plurality of X-axis antennas and a plurality of Y-axis antennas, the X-axis antennas and the Y-axis antennas crossing each other at right angles;
- selection means for selecting at least one X-axis antenna that is proximate the first position indicator, the selected at least one antenna being of a number less than said plurality of X-axis antennas;
- means for transmitting electromagnetic waves to the first position indicator from the selected at least one X-axis antenna, and the first position indicator in response thereto sending signals back to said tablet;
- scanning the plurality of Y-axis antennas in order to determine the position of the first position indicator relative to the tablet, so that the selected at least one X-axis antenna and the plurality of Y-axis antennas in conjunction with one another function to determine the position of the first position indicator, so that the possibility of interference occurring between position indicators is reduced; and
- switching means for switching back and forth between the selected at least one X-axis antenna and the plurality of Y-axis antennas during determination of the position of the first position indicator.

10. The system of claim 9, wherein said selected at least one X-axis antenna includes only one antenna.

11. The system of claim 9, further including said selection means for selecting a second at least one X-axis antenna that is different from the previously selected X-axis antenna, the second selected at least one X-axis antenna being proximate the second position indicator and not proximate the first position indicator, and the second selected at least one antenna being of a number less than said plurality of X-axis antennas;

- means for transmitting electromagnetic waves to the second position indicator from the second selected at least one X-axis antenna, and the second position indicator in response thereto sending signals back to the tablet; and
- means for scanning the plurality of Y-axis antennas in order to determine the position of the second position indicator relative to the tablet, so that the second selected at least one X-axis antenna and the plurality of Y-axis antennas in conjunction with one another function to determine the position of the second position indicator.

* * * * *